United States Patent [19]

Sameh et al.

[11] Patent Number: 5,508,010
[45] Date of Patent: Apr. 16, 1996

[54] METHOD OF SEPARATING FISSION MOLYBDENUM

[75] Inventors: Abdel H. A. Sameh, Ettlingen; Wolfdietrich Leifeld, Eggentein-Leo., both of Germany

[73] Assignee: Forschungszenlrum Karlsruhe GmbH

[21] Appl. No.: 404,172

[22] Filed: Mar. 6, 1995

Related U.S. Application Data

[63] Continuation-in-part of PCT/EP93/02229, Aug. 20, 1993.

[30] Foreign Application Priority Data

Sep. 24, 1992 [DE] Germany .................. 42 31 997.8

[51] Int. Cl.$^6$ ..................................... C01F 13/00
[52] U.S. Cl. ........................... 423/2; 423/53; 423/54
[58] Field of Search ............................ 423/2, 53, 54

[56] References Cited

U.S. PATENT DOCUMENTS

| | | | |
|---|---|---|---|
| 3,970,583 | 7/1976 | Panek-Finda | 252/301.15 |
| 4,094,953 | 6/1978 | Hadi et al. | 423/2 |
| 4,123,497 | 10/1978 | Ruddock | 423/2 |
| 4,131,526 | 12/1978 | Moeglich | 204/149 |
| 4,981,658 | 1/1991 | Ali et al. | 423/2 |

FOREIGN PATENT DOCUMENTS

| | | |
|---|---|---|
| 0245588 | 11/1987 | European Pat. Off. . |
| 2218622 | 9/1974 | France . |
| 2344498 | 10/1977 | France . |
| 2758783 | 7/1979 | Germany . |
| 3100365 | 12/1981 | Germany . |
| 2067343 | 2/1981 | United Kingdom . |

OTHER PUBLICATIONS

Chemical Abstract, vol. 99, No. 24, Dec. 12, 1983, Columbus, Ohio, US, abstract No. 202098t, Sameh, A. Ali; Production of Fission Molybdemun on a Technical Scale at the Nuclear Research Center, Karlsruhe World Patent Index AN:88–041090/6 ZU SU 536665A.

Extraction Ion Exchange, 6(1), 167–182 (1988), J. Bürih et al "Sorption Behaviour of Molybdenum on Different Metal Oxide Ion Exchanges".

*Primary Examiner*—Donald P. Walsh
*Assistant Examiner*—Anthony R. Chi
*Attorney, Agent, or Firm*—Klaus J. Bach

[57] ABSTRACT

In a method of separating fission molybdenum from other fission products, wherein an aqueous solution of the fission molybdenum and the other fission products is supplied to a packet bed of manganese dioxide whereby the fission molybdenum and part of the other fission products are retained in the bed whereas the rest of the fission products is carried away with the aqueous solution and the fission molybdenum is recovered from the fission molybdenum-charged packet bed, the packet bed consists of hydrated manganese dioxide of a particle size of 0.2–0.5 mm from which any finer particles have been removed by a liquid sedimentation procedure.

6 Claims, No Drawings

METHOD OF SEPARATING FISSION MOLYBDENUM

This is a continuation-in-part application of international application PCT/EP93/02229 filed Aug. 20, 1993 claiming the priority of German application P 42 3 1 997.8 dated Sep. 24, 1992.

BACKGROUND OF THE INVENTION

The invention relates to a method of separating fission molybdenum from other fission products in an aqueous solution of the fission products.

Such a method is just one step in the production process for fission molybdenum in which first nuclear fuel (for example a uranium-aluminum alloy essentially with the composition U Al$_3$ encased in aluminum) is irradiated in a nuclear reactor whereby the fission products are generated from the uranium. Of the fission products generated thereby, the fission molybdenum and particularly the isotope $^{99}$Mo is of particular interest since, from the isotope $^{99}$Mo, by radioactive decay, the radioactive isotope $^{99m}$Tc is formed, which is used in the medicine for the diagnosis of organ function failures and also for the treatment of tumors.

During reprocessing, the irradiated nuclear fuel is first treated with an alkaline solution whereby the aluminum and a number of fission products, such as antimony, iodine, tin, tellurium, as well as the sought-for molybdenum, are dissolved. In several subsequent method steps, the molybdenum is then separated from the accompanying fission products. For this separation, a separation process has been developed in the German Nuclear Rese, arch Center at Karlsruhe, wherein chromatographic columns are utilized.

In this process, the alkaline solution of the fission products passes through a first column which comprises a lightly basic exchanger (AG 1×8, 50–500 mesh). In this step, the molybdenum, together with some of the other fission products, are quantitatively retained in the column while a large part of the unwanted fission products passes through the column.

After several purification steps, the molybdenum and small amounts of accompanying other fission products are dissolved and removed from the columns by elutriation with 1–1.5M sulfuric acid and, subsequently, with 0.5M ammonium hydroxide and 1M sodium sulfate.

Rhodanide ions and reduction agents (potassium iodide and sodium sulfite) are admixed to the solution. Under these conditions, a molybdenum complex [Mo(SCN)$_6$]$^{3-}$ is formed. This molybdenum complex can be selectively bound, for example, in the manner as described in DE 23 10 948 A1 or in DE 27 58 783 C3, to an organic ion exchanger such as a chelate-forming resin on a methylen-nitrilo-diacetate-group basis (CHELEX), whereby the impurities of the fission molybdenum are effectively removed.

The process outlined above is described in great detail in the publication "Production of Molybdenum—99" by Sameh A. All in the Proceedings International Symposium on Isotope Applications, Taipei, Taiwan, Republic of China (Dec. 4–5, 1986, Pages 291–303 and also, to some extent, in DE—OS 27 58 783.

It is very important that all process steps are performed rapidly and efficiently in such a reprocessing process since the desired fission isotope $^{99}$Mo decays quickly. The yield does not only depend on the efficiency of the process steps, but also on the time needed to execute the process. For this reason, one also tries to keep the volume of the solutions to be treated as small as possible. Any small step which results in an improvement in this respect and which can be easily integrated in the existing reprocessing process or by which existing processing steps can be easily replaced is, therefore, of commercial interest.

Such a step is represented by a process of the type described earlier. This process is described in detail in the publication by J. Bürck, Sameh A. Ali and H. J. Ache entitled "Sorption Behavior of Molybdenum on Different Metal Oxide Ion Exchangers" in Solvent Extraction and Ion Exchange, 6(1)(1988) pages 167–182. In this publication, the molybdenum-retaining capability of a solid bed consisting of metal oxides (aluminum oxide, tin oxide, manganese dioxide, antimony oxide) is investigated. Although the molybdenum retaining capability of a solid bed of manganese dioxide was found to be very high, the authors conclude (on page 177) that such a solid bed is not suitable for the separation of molybdenum because of its sensitivity to mechanical wear: When molybdenum-containing solutions were treated with manganese dioxide, very fine molybdenum-charged particles were found which could not be filtered out of the liquid phase and which therefore resulted in high losses of fission molybdenum.

From DE 31 00 365 A1 and World Patent Index AN:88-04109016, it is known to separate fission molybdenum from aqueous solutions by adsorption to manganese dioxide, which is disposed on an aluminum oxide or silica gel carrier.

It is the object: of the present invention to modify the process described earlier in such a way that it can be used for the separation of the fission molybdenum from other fission products and to minimize or fully eliminate especially the molybdenum losses which occur because the very fine molybdenum loaded particles are not retained in a manganese dioxide solid bed. Furthermore, it should be possible to integrate the process into the above described reprocessing process in such a way that the reprocessing speed and efficiency is increased.

SUMMARY OF THE INVENTION

In a method of separating fission molybdenum from other fission products, wherein an aqueous solution of the fission molybdenum and the other fission products is supplied to a packet bed of manganese dioxide whereby the fission molybdenum and part of the other fission products are retained whereas the rest of the fission products is carried away with the aqueous solution and the fission molybdenum is recovered from the fission molybdenum-charged packet bed, the packet bed consists of hydrated manganese dioxide of a particle size of 0.2–0.5 mm from which any finer particles have been removed by a liquid sedimentation procedure.

Manganese dioxide is available with a grain size of 0.1–0.05 mm and as such would be quite suitable for use in the packet bed of a column. However, with the movement of the particles relative to each other, a fine particle abrasion takes place and the so formed fine particles are washed out of the column in the process described earlier carrying along some of the fission molybdenum This problem is solved in a surprising manner by removing all fine particles from the solid bed by liquid sedimentation. The liquid sedimentation is achieved in a very simple way by forming a slurry, generally an aqueous slurry and awaiting sedimentation whereupon the water on the top thereof, which contains the fine particles, is removed.

Since in a chromatography column, manganese oxide is preferably used, there is, for the removal of the rest of the fine particles, the additional possibility to fill the column with the wet sedimented manganese oxide, to flood the column with water and to blow air through the column from the bottom for a short period. In this manner, the remainder of the fine particles can be removed together with the water which may still be cloudy. This procedure can be repeated several times until there are no more fine particles in the column and the column is ready for operation. The column charged with fission molybdenum and a part of the other fission products can then be elutriated in the usual manner.

Because of the insufficient abrasive resistance of the manganese oxide particles, fine particles will again have been formed after some period of operation which would again have to be removed in the manner as described above. If the column has already been operated with fission molybdenum, the water used for that purpose is contaminated. For this reason, the reconditioning of fission molybdenum adsorbed by the solid manganese dioxide bed is achieved preferably not by eluating the solids bed but by complete dissolution thereof. In this way, the method according to the invention can be integrated into the reconditioning process as outlined above, preferably between the adsorption process for the highly basic ion exchanger and the adsorption process for the chelex column.

As mentioned, in this reconditioning process the first column including the highly basic ion exchanger (AG 1×8$^R$, 50–500 mesh, preferably 200–400 mesh), is elutriated after being charged with the fission molybdenum and, subsequently, being washed with sulfuric acid and then with ammonium hydroxide. This elutriation is not optimal; it had to be chosen in order to provide suitable operating conditions for the subsequent Chelex column since the Chelex column must not come into contact with nitrates.

Nitric acid or a nitrate solution or a mixture thereof represent a much more effective elutriation solution. Compared to the elutriation solutions used so far, with these elutriation solutions, only about half the volume is required. If the fission molybdenum is recovered from the fission molybdenum-charged solid bed by dissolution of the solid bed after its adsorption on the highly basic ion exchanger then the charged highly basic ion exchanger can be elutriated with nitric acid or nitrates. The elutriation solution is then conducted into the manganese dioxide column where the fission molybdenum is quantitatively adsorbed.

The elutriation of fission molybdenum from the highly basic ion exchanger can be performed basically with a 0.5 MNO$_3$ solution wherein it is not important whether the nitration is derived form nitric acid or from a salt. Higher acidity and/or salt concentrations can also be used. A concentration of about 3 mol/l NO$_3^-$ was found to be the optimum wherein at least 1 mol/l stems from the nitric acid.

The nitration of the eluate can be eliminated simply by washing of the fission molybdenum-charged :manganese dioxide column with water so that the effectiveness of the subsequent Chelex column is not impaired. The charged and washed manganese dioxide solid bed is then dissolved as a whole and the solution obtained thereby is admitted to the Chelex column. The manganese dioxide does not disturb operation of the Chelex column since it is reduced in the process to the second oxidation stage, passes quantitatively through the Chelex column and reaches the waste tanks together with the fission products carried along.

For the dissolution of the manganese dioxide packet bed, preferably sulfuric acid with a concentration of 1 to 7 mol/l is used. Sulfuric acid with a concentration of 2 mol/l is most suitable. Especially preferred is sulfuric acid with an addition of rhodanide ions in a concentration of 0.1 to 3 mol/l and a reduction agent. As reduction agents, iodides, such as potassium iodide, and sulfites, such as sodium sulfite, are particularly suitable.

If the manganese dioxide packet bed is dissolved in such a solution, the old operating conditions for the Chelex column can be maintained. The amount of reduction agents used must be such that, in addition to the amount needed for the necessary reduction of the manganese dioxide into the two-valent state, there is sufficient reduction agent to form the molybdenum complex described earlier. The combination and concentration of the components in the solution are, therefore, preferably so selected that, after dissolution of the manganese dioxide packet bed, optimum operating conditions with regard to the combination and concentration of the solution for the subsequent Chelex column are present.

With the integration of the recovery step for the fission molybdenum by dissolution of the packet bed into the reprocessing process as performed in the past a number of additional advantages are achieved.

In the past, the eluate of the highly basic ion exchanger (AG 1×8) had to be adjusted in a container (consisting for corrosion reasons of tantalum ) to the conditions present in the Chelex columns that is the volume of the eluate and its sulfuric acid concentration had to be determined and, accordingly, the appropriate amounts of rhodanide, iodide, sulfite and, if necessary, further sulfuric acid had to be added. This procedure was very time consuming. In accordance with a particularly preferred embodiment of the method according to the invention, the manganese packet bed is dissolved in a pre-adjusted solution of sulfuric acid, rhodanide, sulfite and iodide, such that the solution obtained thereby can be directly supplied to the Chelex column without time consuming adjustment.

A further advantage, which is quite important in practice, resides in the insensitivity of the manganese dioxide packet bed toward changes in the acidity and salt content during elutriation of the highly basic ion exchangers and the supply for the manganese dioxide packet bed as well as during dissolution of the packet bed ansubsequent charging of the Chelex column.

DESCRIPTION OF A PREFERRED EMBODIMENT

The following data are the results of experiments with molybdenum residues on columns filled with hydrated manganese dioxide (chemical formula Mn O$_2$×nH$_2$O). Manganese dioxide is commercially available under the designation "Manox" (product of Recherche Appliquee du Nord (RAN), Institute des Development, France).

The columns utilized contained each 20 g Manox with a particle size of 0.2 to 0.5 mm. Finer particles were removed by aqueous sedimentation. For this purpose, the columns were filled with water and air was injected from the bottom for a short period. The cloudy water at the top of the columns was removed. This procedure was repeated (two to four times) until the water discharged at the top was absolutely clear.

The molybdenum was supplied to this packet bed by means of 3M nitric acid in two experiments; in two additional experiments, the molybdenum was supplied by a mixture consisting of 2 molar sodium nitrate and 1 molar nitric acid. All solutions contained each 10 mg natural molybdenum and $^{99}$Mo which was added as an indicator to facilitate the analytic registration and balance analysis by means of gammaspectroscopy. The volume of the solution supplied was 2 liters each time.

After the solution was admitted to the manganese dioxide-filled columns each time, the column was first washed with 1 liter of 1 molar nitric acid and then with pure water.

Then the manganese dioxide charged packet bed was dissolved in 2 liters of 2M sulfuric acid containing $SCN^-$, $SO_3^{2-}$, and $I^-$. This solution was conducted through a column filled with 50 g Chelex 100 after the column was preconditioned by a sulfuric acid containing solution of the same combination. Chelex 100 is, as mentioned earlier, a chelate-forming ion exchanger on the basis of a syroldivinylbenzine-copolymer with functional iminodiacetate groups; it is available from BIO RAD, Richmond Calif., USA. The charged column was subsequently washed, in sequence, with 2 liters of 2M sulfuric acid containing rhodanide and sulfite and then with 700 ml water. The molybdenum elutriation was performed with 1 liter of 1M caustic soda solution heated to 50° C.

There was an important question regarding the behavior of additional fission products such as cerium iodine, ruthenium, and zirconium which were possibly carried along with the molybdenum process stream. In order to clarify this question, corresponding experiments were performed with fission product solutions under identical conditions (the same packet bed amount, the same Mo content in concentration and amount). The first experiment was performed in the presence of only fission product indicators. The second experiment was pert brined in the presence of 10 mg of a stable isotope mixture of the respective fission nuclide. The experiment balance analysis was done by gammaspectroscopic measurement of the added radioactive indicators $^{99}Mo$, $^{144}Ce$, $^{123}I$, $^{103}Ru$ and $^{95}Zr$.

It showed that retention of the accompanying fission products by the manganese dioxide depended to a great extent on their concentration in the supply solution. With the exception of ruthenium of which about 75% passes through the column, the indicator amounts of Cerium, zirconium, and the niobium, which is in equilibrium therewith, were fully fixed to the packet bed phase. However, if substantial amounts of these nuclides are present, the situation is quite different. In this case, the retention is greatly reduced. As can be seen from the data given in table 2, it is then 1% for Ce, 20% for Ru, and 55% for Zr. Since, with the use of a manganese dioxide packet bed, only non-measurable amounts of the accompanying fission nuclides are present, they are fully retained with the exception of the ruthenium (which passes through the column at a rate of 75% also by the indicator measurement).

The behavior of the iodine is different as it is, depending on constitution of the solution, present in anionic or elementary form and, in this form, passes fully through the column. This shows that the manganese dioxide packet bed can not only streamline the whole reprocessing process and the waste generated thereby but offers another contribution to the product purity with regard to the elements ruthenium and iodine which are most difficult to handle.

The test results are given in the two following tables:

TABLE 1

|  | Test 1 | Test 2 | Test 3 | Test 4 |
| --- | --- | --- | --- | --- |
| Stationary phase | 20 g Manox, 0.2 to 0.5 mm, wet sedimentation | 20 g Manox, 0.2 to 0.5 mm, wet sedimentation | 20 g Manox, 0.2 to 0.5 mm, wet sedimentation | 20 g Manox, 0.2 to 0.5 mm, wet sedimentation |
| Supply Solution | 10 mg Mo in 2 l 3M $HNO_3$ $^{99}Mo$ – indicator | 10 mg Mo in 2 l 3M $HNO_3$ $^{99}Mo$ – indicator | 10 mg Mo in 2 l 1M $HNO_3$ + 2M $NaNO_3$, $^{99}Mo$ – indicator | 10 mg Mo in 2 l 1M $HNO_3$ + 2M $NaNO_3$, $^{99}Mo$ – indicator |
| Impulse/min in 5 ml Solutions | 1200 | 1122 | 860 | 835 |
| Passage; Impulse/min in 5 mg Solutions | not measurable | not measurable | not measurable | not measurable |
| First Wash Solution | 1 l 1M $HNO_3$ | 1 l 1M $HNO_3$ | 1 l 1M $HNO_3$ | 1 l 1M $HNO_3$ |
| Impulse/min in 5 ml Solution | not measurable | not measurable | not measurable | not measurable |
| Second Wash Solution | 1 l water | 1 l water | 1 l water | 1 l water |
| Impulse/min in 5 ml Solution | not measurable | not measurable | not measurable | not measurable |
| Dissolutions | 2 l 2M $H_2SO_4$ | 0.1 M $SCN^-$ | 0.05M $SO_3^{2-}$ | 0.05M $I^-$ |
| Impulse/min in 5 ml Solutions | 1189 | 1108 | 859 | 832 |
| Yield | 99% | 98.9% | 98.9% | 99.6% |
| Stationary Phase 50 g | 50 g Chelex 10 (100–200 mesh) preconditioned | 50 g Chelex 10 (100–200 mesh) preconditioned | 50 g Chelex 10 (100–200 mesh) preconditioned | 50 g Chelex 10 (100–200 mesh) preconditioned |
| Supply Solution | 10 mg Mo in 2 l 3M $HNO_3$ $^{99}Mo$ – indicator + $Mn^{2+}$ | 10 mg Mo in 2 l 3M $HNO_3$ $^{99}Mo$ – indicator + $Mn^{2+}$ | 10 mg Mo in 2 l 1M $HNO_3$ + 2M $NaNO_3$, $^{99}Mo$ – indicator + $Mn^{2+}$ | 10 mg Mo in 2 l 1M $HNO_3$ + 2M $NaNO_3$, $^{99}Mo$ – indicator + $Mn^{2+}$ |
| Passage | 2 l | 2 l | 2 l | 2 l |
| Impulse/min in 5 ml Solutions | not measurable | not measurable | not measurable | not measurable |
| First Wash Solution | 2 l 2M $H_2SO_4$ | 0.05M $SCN^-$ | 0.025M $SO_3^{2-}$ |  |
| Impulse/min in 5 ml Solutions | not measurable | not measurable | not measurable | not measurable |
| Second Wash Solution | 700 ml | 700 ml | 700 ml | 700 ml |
| Impulse/min in 5 ml Solutions | 10 | 10 | 7 | 8 |
| Elutriation | 1 l 1M NaOH, 50° C. | 1 l 1M NaOH, 50° C. | 1 l 1M NaOH, 50° C. | 1 l 1M NaOH, 50° C. |
| Impulse/min | 2350 | 2189 | 1706 | 1650 |

TABLE 1-continued

|  | Test 1 | Test 2 | Test 3 | Test 4 |
|---|---|---|---|---|
| in 5 ml Solutions Yield | 98.9% | 98.9% | 99.7% | 99.1% |

TABLE 2

Molybdenum and fission nuclide retention on Manox with 3M HNO.

|  | Ce | Rn | Zr | I | Mo |
|---|---|---|---|---|---|
| Part A | | | | | |
| Supply Solution (2 l) | 2090 | 1560 | 1255 | 1812 | 1810 |
|  | 100% | 100% | 100% | 100% | 100% |
| Passage (2 l) | — | 639 | — | 1667 | — |
|  |  | 41% |  | 92% |  |
| HNO$_3$ Wash Solution (1 l) | — | 935 | — | 245 | — |
|  |  | 30% |  | 6.5% |  |
| H$_2$O Wash Solution (1 l) | — | 125 | — | 36 | 7 |
|  |  | 4% |  | 1% | 0.2% |
| Dissolution in 2 l | 2061 | 381 | 1248 | — | 1792 |
|  | 98.6% | 24.4% | 99.4% | 0% | 99% |
| Part B | | | | | |
| Supply Solution (2 l) | 2205 | 1490 | 1240 | 1870 | 1840 |
|  | 100% | 100% | 100% | 100% | 100% |
| Passage (2 l) | 2028 | 822 | 129 | 1739 | — |
|  | 92% | 55.2% | 10.4% | 93% |  |
| HNO$_3$ Wash Solution (1 l) | 308 | 599 | 969 | 212 | — |
|  | 7% | 20.1% | 39.1% | 6.1% |  |
| H$_2$O Wash Solution (1 l) | — | 299 | — | 17 | — |
|  |  | 5% |  | 0.5% |  |
| Waste | 99% | 80.3% | 49.5% | 99.6% | 0% |
| Dissolution in 2 l | — | 270 | 614 | — | 1829 |
|  | 0% | 18.2% | 49.5% | 0% | 99.4% |

This first number relates to the measured impulses in 5 ml solution, in addition, the oercentages are given.

What is claimed is:

1. A method of separating fission molybdenum from other fission products, comprising the steps of:

providing an aqueous solution of the fission molybdenum and the other fission products, supplying said aqueous solution to a packet bed of manganese dioxide whereby the fission molybdenum and part of the other fission products are retained by the packet bed and the aqueous solution with the rest of the fission products is passed through the packet bed;

recovering the fission molybdenum from the fission molybdenum-charged packet bed, said packet belt consisting of hydrated manganese dioxide of a particle size of 0.2–0.5 mm from which the finer particles have been eliminated by sedimentation in a liquid and removal of the top liquid together with the finer particles.

2. A method according to claim 1, wherein said finer particles are removed by flooding the packet bed with a liquid and injecting gas into the liquid for dislodging and washing out said finer particles.

3. A method according to claim 2, wherein said fission molybdenum is recuperated from the fission molybdenum-charged packet bed by dissolution of the packet bed.

4. A method according to claim 3, wherein said packet bed is dissolved in sulfuric acid.

5. A method according to claim 4, wherein said sulfuric acid contains rhodanide ions and a reduction agent.

6. A method according to claim 5, wherein at least one of the group of sulfite ions and iodide ions is used as a reduction agent.

* * * * *